United States Patent [19]

Keske et al.

[11] 4,080,108
[45] Mar. 22, 1978

[54] IMPROVED LUBRICATION PUMP FOR A TORQUE PROPORTIONING DIFFERENTIAL

[75] Inventors: Frank E. Keske, Chillicothe; David E. Hackett, Washington, both of Ill.

[73] Assignee: Caterpillar Tractor Co., Peoria, Ill.

[21] Appl. No.: 716,505

[22] Filed: Aug. 23, 1976

Related U.S. Application Data

[62] Division of Ser. No. 571,117, Apr. 24, 1975.

[51] Int. Cl.² .............................................. F04B 49/08
[52] U.S. Cl. ...................... 417/214; 92/129; 417/534
[58] Field of Search ............ 417/214, 534–537, 417/569, 570; 92/84, 85 A, 129, 140; 74/53, 55, 107, 559, 711, 54, 102, 110; 137/512.1, 512.15, 514

[56] References Cited

U.S. PATENT DOCUMENTS

| | | | |
|---|---|---|---|
| 387,234 | 8/1888 | Hutchinson | 92/84 |
| 1,669,889 | 5/1928 | Andrews et al. | 417/569 X |
| 1,791,364 | 2/1931 | Lewis | 417/534 |
| 2,272,518 | 2/1942 | Fraser et al. | 417/534 |
| 2,381,259 | 8/1945 | Coffey | 92/84 X |
| 2,572,106 | 10/1951 | Burrell | 74/102 X |
| 3,186,343 | 6/1965 | Schneider | 417/568 |
| 3,230,795 | 1/1966 | Mueller | 74/711 |
| 3,233,554 | 2/1966 | Huber et al. | 417/534 X |
| 3,272,132 | 9/1966 | Stoelting et al. | 417/534 X |
| 3,543,589 | 12/1970 | Loughran | 74/54 |
| 4,006,797 | 2/1977 | Keske | 417/214 X |

Primary Examiner—William L. Freeh
Assistant Examiner—Edward Look
Attorney, Agent, or Firm—Phillips, Moore, Weissenberger, Lempio & Majestic

[57] ABSTRACT

A differential comprises a pair of face gears, a carrier rotatably mounted between the face gears and a plurality of pinion gears rotatably mounted on the carrier and intermeshing with the face gears for differentially permitting one face gear to rotate relative to the other face gear. The pinion gears are each rotatably mounted in bearings and a lubrication system is provided for pumping lubricating fluid to the bearings for lubrication and cooling purposes. The lubrication system comprises a double-acting pump mounted adjacent to the carrier and a rocker arm pivotally mounted adjacent to each end of the pump. A first end of the rocker arm engages a cam attached to the carrier whereas a second thereof engages an end of a piston rod reciprocably mounted in the pump to pump lubricating fluid to the bearing. The pump comprises a piston slidably mounted on a rod, a pair of retainers secured to the rod and disposed on either side of the piston, and a compression coil spring disposed between each retainer and the piston.

30 Claims, 6 Drawing Figures

Fig_2_

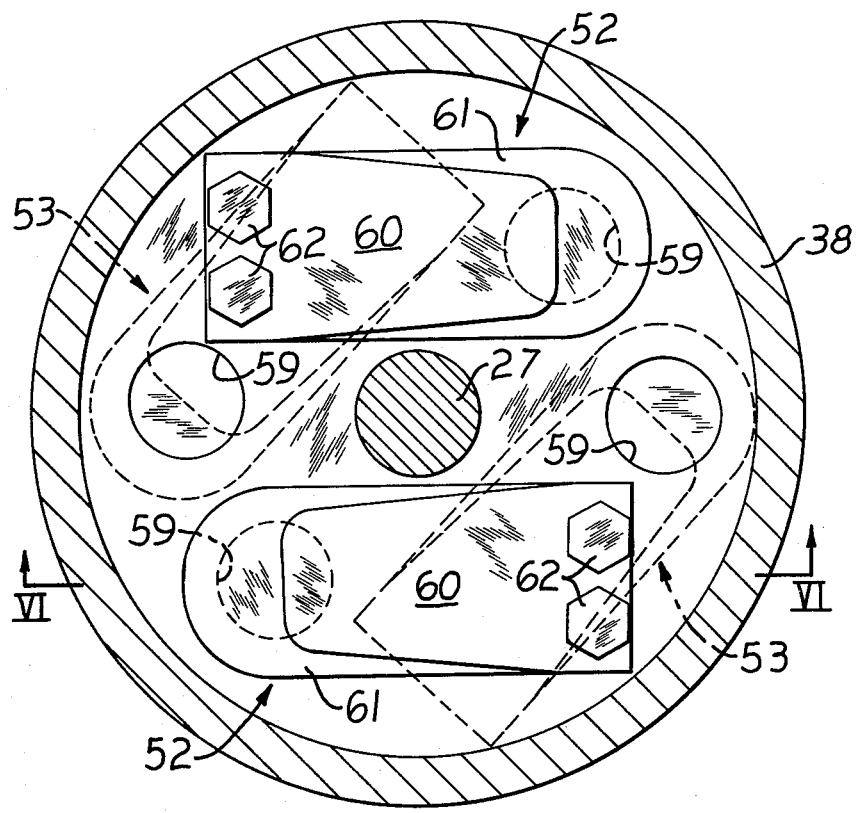
Fig_5_
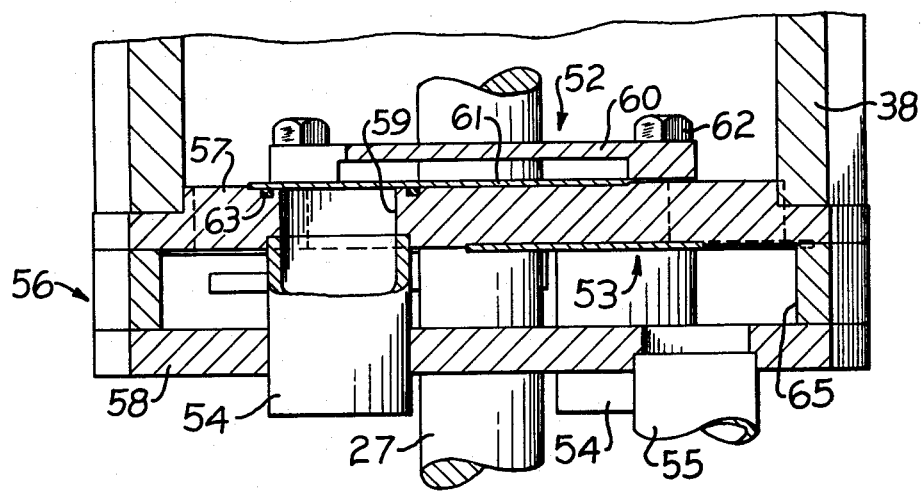
Fig_6_

IMPROVED LUBRICATION PUMP FOR A TORQUE PROPORTIONING DIFFERENTIAL

This is a division, of Ser. No. 571,117, filed Apr. 24, 1975.

BACKGROUND OF THE INVENTION

This invention relates to a lubrication means, particularly adapted for lubricating and cooling the pinion bearings of a differential.

Conventional differentials for vehicles, such as the one disclosed in U.S. Pat. No. 3,237,483, comprise a pair of face gears and a plurality of pinion gears intermeshed between the face gears for permitting relative rotation therebetween. The pinion gears are each rotatably mounted in bearings which are subjected to considerable loads during operation of the differential. Various pumps have been proposed for use in conjunction with differentials for lubricating and cooling the various bearing assemblies thereof. For example, gear and vane type pumps are directionally limited to thus prevent adequate lubrication of such bearing assemblies during a reverse operation of a vehicle, for example. Likewise, single-acting pumps have various deficiencies, such as the inability to assure adequate lubrication to the bearing assemblies during low speed operation of a vehicle.

SUMMARY OF THE INVENTION

An object of this invention is to provide an efficient and non-complex lubrication means which is economical to manufacture and exhibits a long life expectancy. The lubrication means comprises a double-acting pump means and actuating means operatively associated with each end of the pump means for actuating the same in response to rotation of a cam. In the preferred embodiment of this invention, the cam is attached to a carrier rotatably mounted in a torque proportioning differential to continuously supply an adequate amount of lubricant to bearings employed therein, notwithstanding the direction and speed of rotation of the carrier.

The pump means comprises a piston slidably mounted on a rod, a pair of longitudinally disposed retainers secured on the rod on either side of the piston and biasing means disposed between each of the retainers and the piston for biasing the piston to a predetermined axial position on the rod.

BRIEF DESCRIPTION OF THE DRAWINGS

Other objects of this invention will become apparent from the following description and accompanying drawings wherein:

FIG. 5 is an enlarged cross sectional view, taken in a direction of arrows V—V in FIG. 4; and FIG. 6 is a sectional view, taken in a direction of arrows VI—VI in FIG. 5.

DETAILED DESCRIPTION

Figure 1:
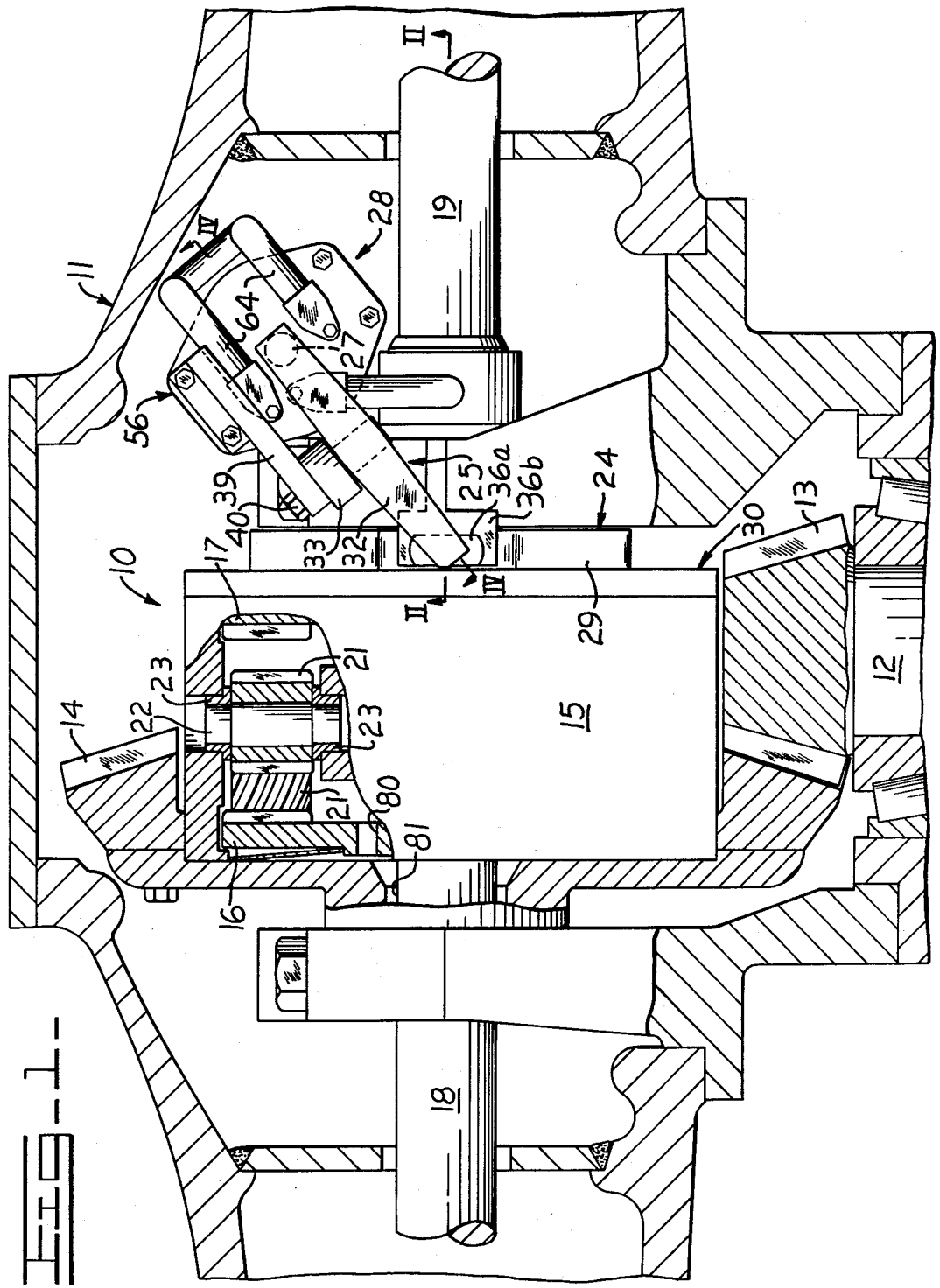
FIG. 1 is a top plan view of a torque proportioning differential, suitably sectioned to expose internal constructions thereof, and a lubrication means of this invention associated therewith.
Figure 2:
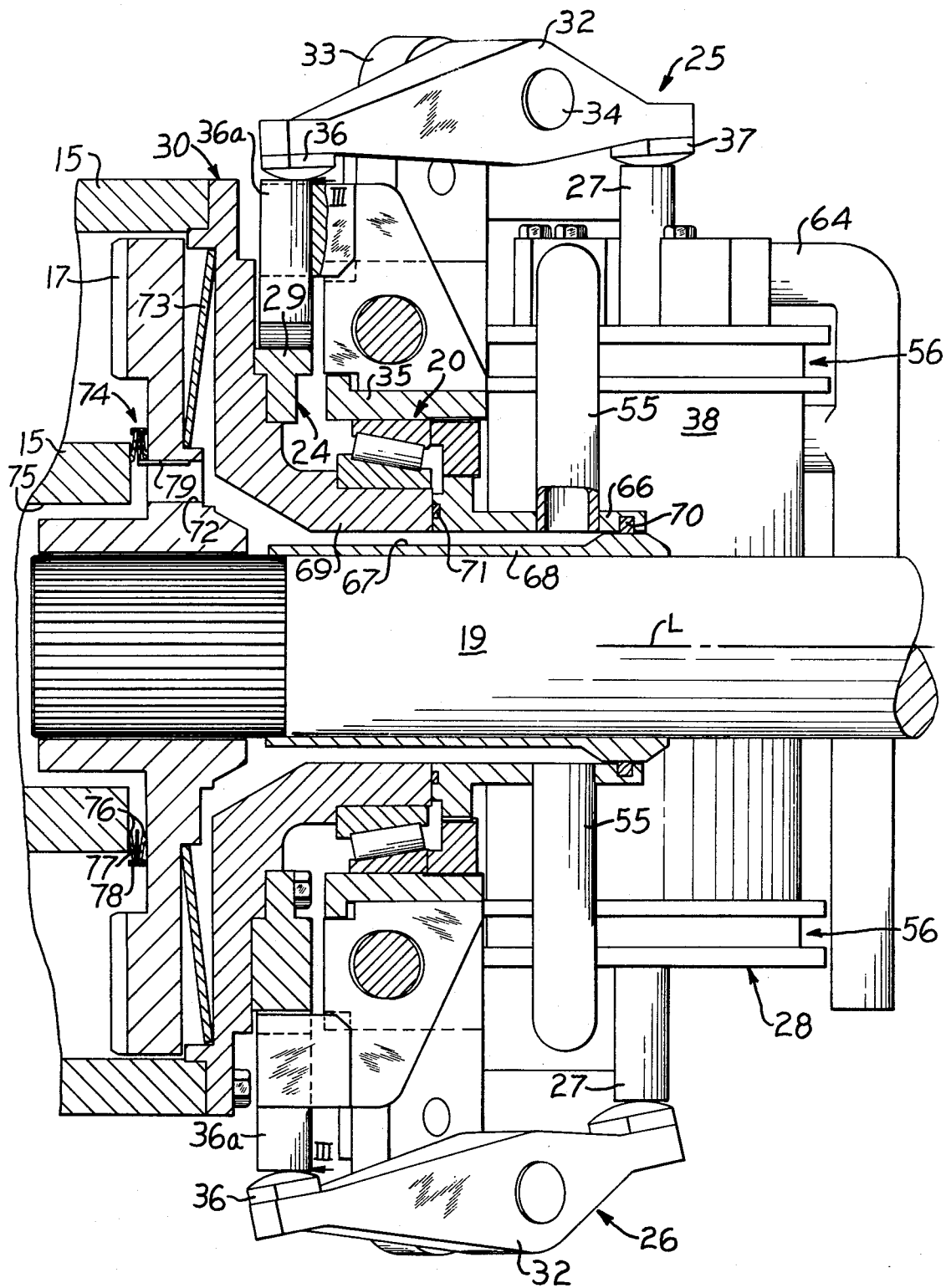
FIG. 2 is an enlarged partially sectioned view, taken in a direction of arrows II—II in FIG. 1.

FIGS. 1 and 2 illustrate a torque proportioning differential 10 suitably mounted in a bell housing 11 of a construction vehicle, such as a wheel loader. The differential may be of the type disclosed in U.S. Pat. No. 3,237,483 wherein an engine-driven input shaft 12 has a pinion 13 secured thereon to rotate a bevel gear 14. The bevel gear is suitably secured to a carrier 15 for rotation therewith whereas a pair of opposed and longitudinally spaced helical face gears 16 and 17 are attached to wheel axles 18 and 19, respectively.

As shown in FIG. 2, axle 19 is rotatably mounted in an annular bearing assembly 20 and is adapted to be connected to a respective wheel of the vehicle. The differential may further comprise four sets of three intermeshing pinion gear means or helical pinions 21 (two shown) interconnected between the face gears for differentially permitting one of the face gears to rotate faster than the other face gear (FIG. 1). Each pinion is mounted on a shaft 22 having each end thereof rotatably mounted on the carrier by an annular bearing means 23. Although the lubrication means hereinafter described is particularly useful for lubricating and cooling bearing means 23, it should be understood that such lubrication means could be also utilized for lubricating bearing assembly 20 (FIG. 2), for example, or for lubricating bearings employed in other types of machinery.

In general, the lubrication means preferably comprises a cam means 24 attached to carrier 15 for rotation therewith and adapted to oscillate actuating means, preferably in the form of a pair of rocker arm assemblies 25 and 26 pivotally mounted adjacent to the carrier. In turn, the rocker arm assemblies are adapted to reciprocate a common piston rod 27 of a doubleacting pump means 28 to pump lubricant to bearing means 23 via hereinafter described passage means. As will be further understood, the pump means will function to provide bearing means 23 with an adequate supply of lubricant throughout all operational speeds of the vehicle and during both the forward and reverse modes of operation thereof.

Figure 3:
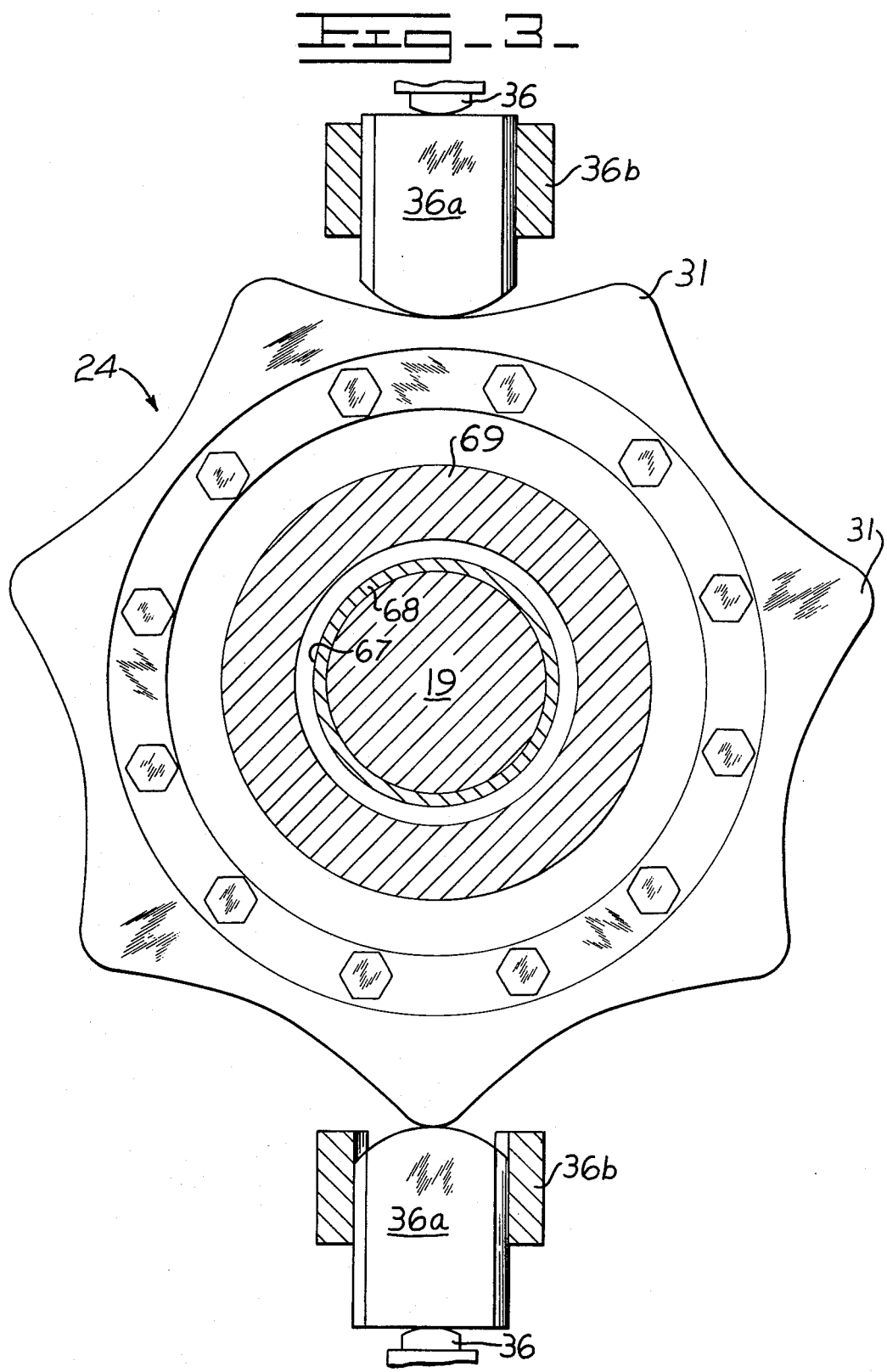
FIG. 3 is a cross sectional view, taken generally in a direction of arrows III—III in FIG. 2.

Referring to FIGS. 2 and 3, cam means 24 preferably comprises a plate cam 29 bolted or otherwise secured to an end cover 30 of carrier 15. A plurality of symmetrical cam lobes 31 extend radially outwardly on the plate cam to oscillate rocker arm assemblies 25 and 26. An odd number (e.g., seven) of cam lobes are provided on the plate cam.

As shown in FIG. 2, rocker arm assemblies 25 and 26 are substantially identical in their construction and arrangement and, therefore, only one thereof will be described in detail. Rocker arm assembly 25, for example, comprises a rocker arm or bell crank 32 pivotally mounted intermediate its ends on a bracket 33 by a pin 34. The bracket is suitably secured to a cap 35 for bearing assembly 20. The cap is suitably attached to bell housing 11 whereby the lubrication means of this invention can be readily adapted for use with a standard differential.

As shown in FIGS. 2 and 3, a first end of rocker arm 32 has a hardened slipper 36 secured thereon which rides on the upper end of a follower 36a, reciprocally mounted in a slotted guide 36b secured to cap 35. The lower end of the follower rides on cam lobes 31 to oscillate the rocker arm. Followers 36a are diametrically opposed on the cam means with the lower one shown in FIG. 3 in engagement with the apex of a cam lobe 31 and with the upper follower shown engaging a minimum radius on the cam, defined between two circumferentially adjacent cam lobes. Such arrangement provides for the precise reciprocation of piston rod 27 for purposes hereinafter more fully explained.

Figure 4:
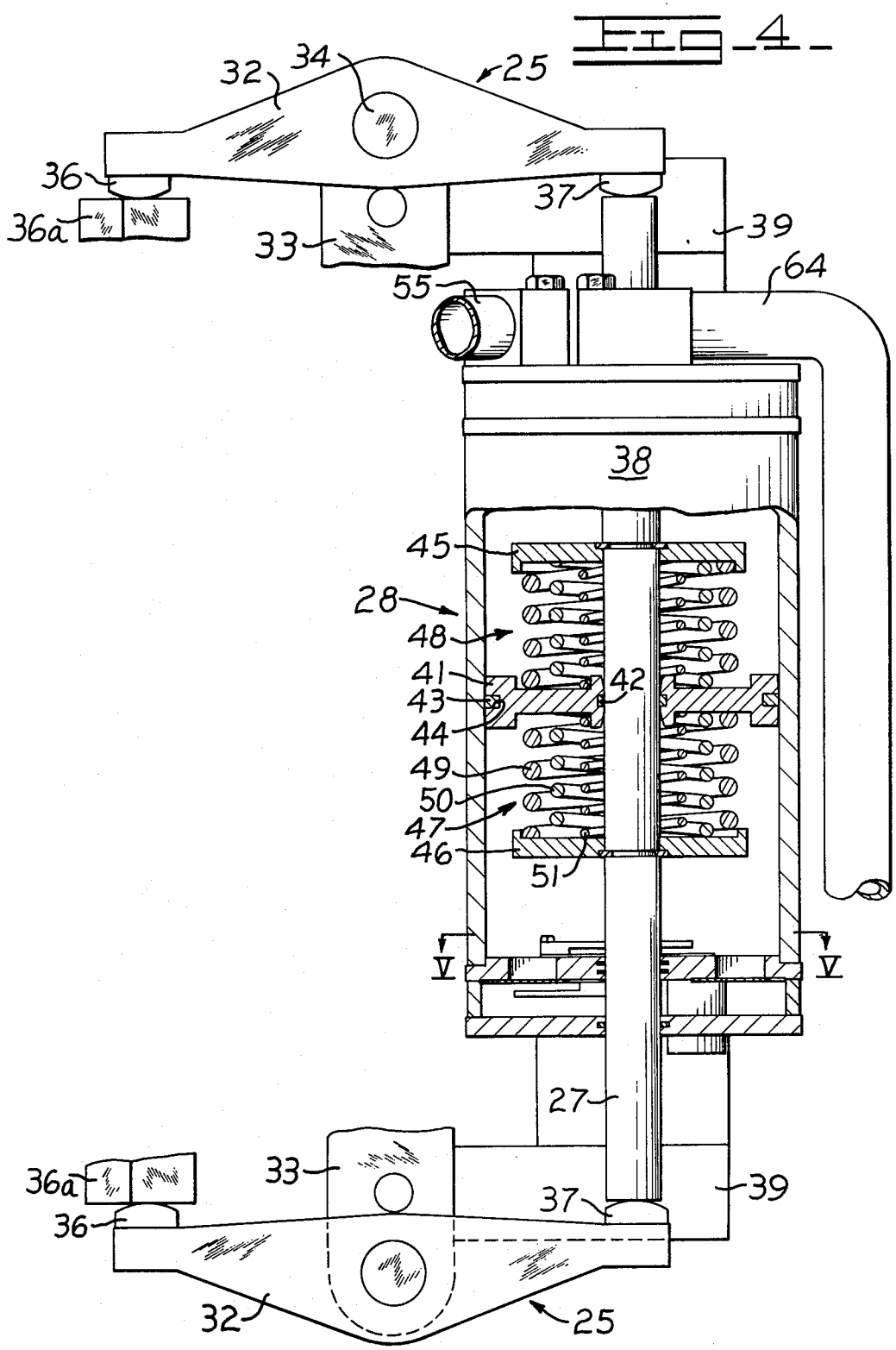
FIG. 4 is an enlarged sectional view, taken in a direction of arrows IV—IV in FIG. 1.

Referring to FIGS. 2 and 4, the second, opposite end of rocker arm 32 has a slipper 37 secured thereon to engage a respective end of piston rod 27. The piston rod is reciprocally mounted in a cylindrical housing 38, bolted or otherwise suitably secured between a pair of spaced brackets 39. Such brackets are each suitably secured by bolts 40 to a respective bracket 33 (FIG. 1).

Referring to FIG. 4, the double-acting pump means further comprises an annular piston 41 slidably mounted on rod 27 by a sealing ring 42. A piston ring 43 is suitably mounted in an annular groove 44, formed on the periphery of the piston, to provide a separated pair of working chambers on either side of the piston. A pair of longitudinally spaced annular retainers 45 and 46 are suitably keyed to rod 27 for reciprocation therewith and biasing or spring means 47 and 48 are suitably mounted between the piston and the respective retainer.

Each spring means preferably comprises a plurality of concentric compression coil springs 49, 50 and 51 sequentially comprising variable spring stiffnesses and rates. The coil springs are preloaded to permit the pump means to provide a full stroke at low discharge pressures. When the pump discharge pressure rises to 30 psi, for example, the pump stroke will approach zero (0) by balancing the force of the hydraulic pressure of the lubricating fluid against the counteracting spring force. Such action will limit the flow of fluid from the pump means without having to resort to the use of an external relief valve or the like.

Referring to FIGS. 5 and 6, pairs of substantially identical inlet valve means 52 and outlet valve means 53 are provided at each end of the pump means for selectively communicating one of the divided working chambers of the pump means with conduits 54 and 55, respectively. Each end of housing 38 is closed by a head 56 including inner and outer annular plates 57 and 58, respectively, secured together by an annular ring. The two inlet conduits 54 communicate directly with a respective working chamber in that they each extend through outer plate 52 and terminate at an inlet port 59 formed through inner plate 57.

Each of the valve means 52 and 53 preferably comprises a flapper valve including a plate 60 and an underlying flexible flapper valve member or leaf spring 61, both attached to plate 57, for example, by common fastening means constituting a pair of cap screws 62. An O-ring seal 63 is seated in an annular groove formed in plate 57 to circumvent port 59, for example, to provide a seal thereat when flapper valve member 61 is in its illustrated closed position. Bracket 60 further functions as a stop means, limiting the upward movement of flapper 61 relative to inlet port 59. As suggested above, the remaining seven flapper valves and respective inlet and outlet ports are constructed and arranged in a like manner.

Pump means 28 is preferably vertically orientated and immersed in lubricating fluid to approximately one-half its vertical height (level L in FIG. 2) whereby lubricant drawn through the bottom two inlet conduits 54 is communicated directly into inlet ports 59. Lubricant is communicated to the pair of inlet flapper valves 53 on the upper end of the pump means by a conduit 64 (FIG. 2), having its lower end immersed in the lubricating fluid retained in bell housing 11. As shown in FIG. 1, the upper end of the latter conduit is branched to communicate the lubricant to the two inlet flapper valves (not shown) mounted on upper head 56 of the pump means.

Referring again to FIGS. 5 and 6, one end of each outlet conduit 55 is adapted to receive lubricant from a respective working of pump means 28 via a respective pair of outlet valve means 53 and a common chamber 65 defined in a respective head 56 of the pump means. As shown in FIG. 2, the opposite end of each outlet conduit is secured to a slip ring 66 which defines an annular passage 67 with a cylindrical sleeve 68 suitably secured to axle 19 and an annular hub portion 69 of cover 30. Sealing rings 70 and 71 are suitably mounted between the slip ring and sleeve 68 and hub portion 69, respectively.

The lubricating fluid will flow from passage 67, through a plurality of circumferentially disposed ports 72, formed through face gear 17, and into carrier 15 to lubricate and cool bearing means 23. A Belleville spring washer 73 is disposed axially between gear 17 and cover member 30 to preload the gear and to aid in directing the lubricant from ports 72 and into the carrier. In addition, an annular dam 74 is disposed between the carrier and gear 17 to direct the lubricating fluid through an annular passage 75 wherefrom it is directed to the inner ends of shafts 22 of pinions 21 (FIG. 1).

Dam means 74 may comprise a pair of Belleville spring washers 76, an annular washer 77 sandwiched between the spring washers and an outer annular retainer 78 securing the outer periphery of the washers together. Intermediate washer 77 has a plurality of axially disposed projections 79 formed integrally thereon for retaining the dam means on gear 17 for rotation therewith. In particular, each projection engages in a port 72 to prevent both rotational and radial displacement of the dam means relative to the gear.

In operation, rotation of carrier 15 in either direction will function to reciprocate piston rod 27 due to the oscillation of rocker arms 32 in response to rotation of cam means 24. Cam lobes 31 are identical to provide an 1 062 in. travel of the piston rod, for example, for both the forward and reverse modes of vehicle operation. Spring means 47 and 48 are suitably preloaded to assure full stroke of the pump means at low discharge pressures.

When the discharge pressure of the pump means exceeds 30 psi, for example, the pump stroke of piston 41 will approach zero (0) displacement by balancing the resultant force of the pressurized fluid in one working chamber against the force of the springs disposed in the other working chamber. Such action will thus automatically limit fluid flow from the pump means without the use of external relief valves or the like. In normal operation wherein piston 41 reciprocates, fluid is drawn into one of the working chambers through inlet valve means 52 whereas pressurized fluid is pumped out of the other working chamber through outlet valve means 53 on the opposite end of the pump means.

Discharge of pressurized fluid through the outlet valve means will be pumped through a pair of respective outlet conduits 55 and into annular passage 67 (FIG. 2). The fluid will proceed to flow through ports 72 and passage 75 wherefrom it will flow around and over the inner ends of pinion shafts 22. Centrifugal force created upon rotation of the carrier will aid in discharging the lubricant radially outwardly for cooling and lubricating bearing means 23. As shown in FIG. 1, fluid egresses from the carrier via a plurality of radially disposed ports 80 formed through second face gear 16 and an annular passage 81 communicating internally of bell housing 11. As described above, inlet conduits 54 and 64 function to communicate lubricating fluid to the inlet valve means 53 located at the lower and upper ends of the pump means, respectively.

We claim:

1. In a lubrication system adapted to communicate lubricating fluid to bearings or the like, the invention comprising a double-acting pump means, inlet passage means for communicating fluid into each end of said pump means, outlet means for communicating fluid from each end of said pump means and actuating means operatively associated with each end of said pump means for drawing fluid into said pump means through said inlet passage means at one end thereof while simultaneously pumping fluid from the other end thereof to said outlet passage means, said pump means comprising a cylindrical housing, a piston rod reciprocally mounted in said housing to engage a respective actuating means at each end thereof, an annular piston slidably mounted on said rod to define a working chamber on either side thereof, a pair of retainers attached to said rod in longitudinally spaced relationship thereon and on either side of said piston and biasing means disposed between each of said retainers and said piston for normally biasing said piston to a predetermined axial position on said rod.

2. The lubrication system of claim 1 further comprising annular sealing means disposed circumferentially about said piston and engaging said housing to seal and separate said working chambers from each other.

3. The lubrication system of claim 1 wherein said housing comprises an annular head secured to each end thereof, inlet valve means mounted on each head and communicating with a respective one of said inlet passage means and outlet valve means mounted on each head and communicating with a respective one of said outlet passage means.

4. The lubrication system of claim 3 wherein each of said heads comprises a pair of axially spaced inner and outer plates, said inlet valve means mounted on said inner plate to normally close inlet port means defined therethrough and communicating with said inlet passage means and said outlet valve means mounted on said inner plate to normally close outer port means defined therethrough and communicating with said outlet passage means.

5. The lubrication system of claim 4 wherein each of said inlet and outlet valve means comprises at least one flapper valve including a flexible valve member normally closing respective ones of said inlet and outlet port means.

6. The lubrication system of claim 5 wherein each of said flapper valves further comprises a stop member overlying said flexible valve member for limiting movement of said member away from a respective inlet or outlet port means.

7. The lubrication system of claim 6 wherein said stop means constitutes a bracket extending substantially the full length of said valve member and wherein said valve member and said bracket are attached to a respective plate by common fastening means.

8. The lubrication system of claim 7 wherein each of said biasing means comprises at least one compression coil spring.

9. The lubrication system of claim 8 wherein each of said biasing means constitutes a plurality of concentrically disposed compression coil springs.

10. The lubrication system of claim 5 wherein each of said inlet valve means and each of said outlet valve means comprises a pair of said flapper valves.

11. The lubrication system of claim 5 wherein said inlet passage means comprises a pair of conduits each extending through said outer plate and secured to said inner plate to communicate with a respective inlet port means.

12. The lubrication system of claim 11 wherein said outlet passage means comprises a chamber defined in said head and a conduit secured to said outer plate to communicate with said chamber.

13. The lubrication system of claim 1 wherein said actuating means comprises a rocker arm pivotally mounted between first and second ends thereof and a plate cam rotatably mounted adjacent to and between said rocker arms and operatively connected thereto to reciprocate the first ends thereof, the second ends of said rocker arms each engaging a respective end of said piston rod.

14. The lubrication system of claim 13 wherein an uneven number of cam lobes are formed on the periphery of said plate cam.

15. The lubrication system of claim 1 wherein said inlet passage means comprises a pair of conduits communicating with each end of said pump means.

16. The lubrication system of claim 15 wherein said outlet passage means comprises a single conduit communicating with each end of said pump means.

17. A double-acting pump means comprising inlet means for communicating fluid into each end of said pump means, outlet means for communicating fluid from each end of said pump means, a cylindrical housing, a piston rod reciprocally mounted in said housing adapted to reciprocate upon engagement with actuating means at each end thereof, an annular piston slidably mounted on said rod to define a working chamber on either side thereof, a pair of retainers attached to said rod in longitudinally spaced relationship thereon and on either side of said piston and biasing means disposed between each of said retainers and said piston for normally biasing said piston to a predetermined axial position on said rod.

18. The pump means of claim 17 further comprising annular sealing means disposed circumferentially about said piston and engaging said housing to seal and separate said working chambers from each other.

19. The pump means of claim 17 wherein each of said biasing means comprises at least one compression coil spring.

20. The pump means of claim 19 wherein each of said biasing means constitutes a plurality of concentrically disposed compression coil springs.

21. The pump means of claim 17 wherein said housing comprises an annular head secured to each end thereof, inlet valve means mounted on each head and communicating with a respective one of said inlet means and outlet valve means mounted on each head and communicating with a respective one of said outlet means.

22. The pump means of claim 21 wherein each of said heads comprises a pair of axially spaced inner and outer plates, said inlet valve means mounted on said inner plate to normally close inlet port means defined therethrough and communicating with said inlet means and said outlet valve means mounted on said inner plate to normally close outer port means defined therethrough and communicating with said outlet means.

23. The pump means of claim 22 wherein each of said inlet and outlet valve means comprises at least one flapper valve including a flexible valve member normally closing respective ones of said inlet and outlet port means.

24. The pump means of cliam 23 wherein each of said flapper valves further comprises a stop member overlying said flexible valve member for limiting movement of said member away from a respective inlet or outlet port means.

25. The pump means of claim 24 wherein said stop means constitutes a bracket extending substantially the full length of said valve member and wherein said valve member and said bracket are attached to a respective plate by common fastening means.

26. The pump means of claim 23 wherein each of said inlet valve means and each of said outlet valve means comprises a pair of said flapper valves.

27. The pump means of claim 23 wherein said inlet means comprises a pair of conduits each extending through said outer plate and secured to said inner plate to communicate with a respective inlet port means.

28. The pump means of claim 27 wherein said outlet means comprises a chamber defined in said head and a conduit secured to said outer plate to communicate with said chamber.

29. The pump means of claim 17 wherein said inlet means comprises a pair of conduits communicating with each end of said pump means.

30. The pump means of claim 29 wherein said outlet means comprises a single conduit communicating with each end of said pump means.

* * * * *